US011777146B2

United States Patent
Chen et al.

(10) Patent No.: US 11,777,146 B2
(45) Date of Patent: Oct. 3, 2023

(54) PREPARATION METHOD OF SOLID ELECTROLYTE

(71) Applicant: Qingdao University of Science and Technology, Qingdao (CN)

(72) Inventors: Yuwei Chen, Qingdao (CN); Jiying Yang, Qingdao (CN); Junbo Che, Qingdao (CN); Quan Wang, Qingdao (CN); Jinjin Hu, Qingdao (CN); Jianwen Wang, Qingdao (CN); Yu Li, Qingdao (CN); Jianming Zhang, Qingdao (CN)

(73) Assignee: Qingdao University of Science and Technology, Qingdao (CN)

( * ) Notice: Subject to any disclaimer, the term of this patent is extended or adjusted under 35 U.S.C. 154(b) by 0 days.

(21) Appl. No.: 18/150,114

(22) Filed: Jan. 4, 2023

(65) Prior Publication Data
US 2023/0155172 A1 May 18, 2023

Related U.S. Application Data

(63) Continuation of application No. PCT/CN2021/127089, filed on Oct. 28, 2021.

(30) Foreign Application Priority Data

Jan. 28, 2021 (CN) .......................... 202110119341.0

(51) Int. Cl.
*H01M 10/0565* (2010.01)
*H01M 10/0525* (2010.01)

(52) U.S. Cl.
CPC ... *H01M 10/0565* (2013.01); *H01M 10/0525* (2013.01); *H01M 2300/0082* (2013.01); *H01M 2300/0085* (2013.01)

(58) Field of Classification Search
CPC ......... H01M 10/0565; H01M 10/0525; H01M 2300/0082; H01M 2300/0085
(Continued)

(56) References Cited

U.S. PATENT DOCUMENTS

| 11,522,217 | B2 * | 12/2022 | Ouspenski | ........ H01M 10/0525 |
| 2014/0178513 | A1 * | 6/2014 | Matthews | ............. B29C 48/475 425/6 |
| 2017/0250442 | A1 | 8/2017 | Maranas et al. | |

FOREIGN PATENT DOCUMENTS

| CN | 109716556 A | 5/2019 |
| CN | 110433766 A | 11/2019 |
| CN | 112786959 A | 5/2021 |

* cited by examiner

*Primary Examiner* — Gary D Harris
(74) *Attorney, Agent, or Firm* — Nitin Kaushik

(57) ABSTRACT

The present disclosure belongs to the field of energy materials, and relates to a preparation method of a solid electrolyte, in particular to a method for forming a membrane by using an electrolyte to activate a porous powder material prepared by in-situ polymerization of a polymer on the surfaces of cellulose nanocrystals, and then hot-pressing. According to the technical solution of the present disclosure, cellulose nanocrystals are used as templates, the powder material with a porous structure is prepared by in-situ polymerization growth of the polymer on the surfaces of the cellulose nanocrystals, a small amount of electrolyte is used to activate the powder, and the solid electrolyte is prepared by hot-pressing membrane formation. The solid electrolyte prepared by the present disclosure has excellent electrochemical performance and mechanical performance, and a broad application prospect.

6 Claims, 4 Drawing Sheets

(58) Field of Classification Search
USPC .......................................................... 429/303
See application file for complete search history.

PREPARATION METHOD OF SOLID ELECTROLYTE

CROSS-REFERENCE TO RELATED APPLICATIONS

The application claims priority to Chinese patent application No. 202110119341.0, filed on Jan. 28, 2021, the entire contents of which are incorporated herein by reference.

TECHNICAL FIELD

The present disclosure belongs to the field of energy materials, and relates to a preparation method of a solid electrolyte, in particular to a method for forming a membrane by using an electrolyte to activate a porous powder material prepared by in-situ polymerization of a polymer on the surfaces of cellulose nanocrystals, and then hot-pressing.

BACKGROUND

Relatively safe energy storage devices with relatively high energy density and excellent cycle stability are required for future energy storage. However, the energy storage of commercial lithium-ion batteries is limited by the theoretical capacity, and the use of liquid electrolytes brings huge potential safety hazards, such as flammability and high toxicity. In order to solve this problem, solid electrolytes have attracted people's widespread attention. Polymer solid electrolytes have good flexibility and processability. However, the low ionic conductivity ($10^{-6}$ S/cm) at room temperature and poor independent membrane-forming performance of the polymer solid electrolytes are the bottlenecks that hinder the large-scale application of the polymer solid electrolytes. The common methods to solve these problems are as follows: 1) designing a copolymerization and cross-linking network; 2) increasing the concentration of lithium salts; 3) adding plasticizers; and 4) adding inorganic fillers. However, the above methods improve ionic conductivity, but at the expense of mechanical properties. Therefore, it is of great significance to improve the ionic conductivity and the membrane-forming performance at room temperature.

SUMMARY

Aiming at the problems that it is difficult for traditional solid electrolytes to have a high room temperature ionic conductivity and a good membrane-forming performance at the same time, preparation technologies of the traditional solid electrolytes have low efficiency, and generate a large amount of toxic vapor, etc., the present disclosure provides a preparation method of a solid electrolyte.

The present disclosure is aimed at providing a method for preparing a solid electrolyte by using an electrolyte to activate a porous powder material prepared by in-situ polymerization of a polymer on the surfaces of cellulose nanocrystals, and then hot-pressing.

The present disclosure can be realized by the following technical solution.

The preparation method of the solid electrolyte includes the following steps:

(1) adding a cellulose nanocrystal aqueous solution into a three-necked flask under the protection of nitrogen, then adding an initiator and a polymer monomer to the three-necked flask, magnetically stirring at a constant temperature of 20-80° C. (preferably 35° C.) until the reaction is complete (preferably, the stirring time is 2 hours), washing a product with water several times and drying the product to obtain a porous powder material;

(2) moving the porous powder material obtained in the step (1) into a sample bottle, slowly dropwise dropping an appropriate amount of electrolyte solution into the sample bottle, sealing the sample bottle, storing the sample bottle in a 60-90° C. (preferably 80° C.) constant-pressure constant-temperature oven for 8-15 hours (preferably 10 hours), then moving the sample bottle into a 60-90° C. (preferably 80 DEG C.) vacuum constant-temperature oven, adjusting the solvent content to 10 wt %-15 wt %, and taking an appropriate amount of samples for hot-pressing to form a membrane, thereby obtaining a solid electrolyte membrane; and (3) storing the solid electrolyte membrane obtained in the step (2) in a glove box, and cutting the solid electrolyte membrane according to required specifications to obtain the target solid electrolyte.

In the step (1), the addition ratio of the cellulose nanocrystal aqueous solution to the initiator to the polymer monomer is 40 ml:(0.05-0.1) g:(1-2) ml, preferably 40 ml:0.08 g:(1-2) ml, and the solid content of the cellulose nanocrystal aqueous solution is 0.4%-1.2%.

In the step (2), the mass ratio of the porous powder material to the electrolyte added to the electrolyte solution is 1:(1-2).

Further, in the step (1), the solid content of the cellulose nanocrystal aqueous solution is 0.5%, and the pH range is 1-4, preferably, 1.8.

Further, in step (1), the initiator is ammonium ceric nitrate.

Further, in the step (1), the polymer monomer is methyl methacrylate, ethyl acrylate, acrylonitrile or vinyl alcohol.

Further, in the step (2), the electrolyte solution is an ethylene carbonate solution of bistrifluoromethanesulfonimide lithium salt, a propylene carbonate solution of bistrifluoromethanesulfonimide lithium salt or an ethylene carbonate solution of lithium hexafluorophosphate.

Further, in the step (2), the condition of hot-pressing membrane formation is 10 MPa/150° C.

Compared with the prior art, the present disclosure has the following advantages and beneficial effects:

1. Cellulose nanocrystals not only serve as matrixes for polymer growth, but also serve as one-dimensional nanorods with very high strength. The polymer grows in situ on the surfaces of the cellulose nanocrystals, which is equivalent to the introduction of cross-linking points into the polymer network, and thus, the mechanical property is improved. There are a lot of functional groups on the surfaces of the cellulose nanocrystals, which can act as conductive bridges during ion transport and lower the energy barrier of ion conduction, and thus the ionic conductivity and the energy density and cycle stability of the battery are improved.

2. At present, the polymer solid electrolytes are prepared basically by solution evaporation membrane formation, but less by hot-pressing membrane formation as the existing system will have similar homogeneity problems if hot-pressing is used. However, as the material prepared by the present disclosure has porous characteristics, the hot-pressing membrane formation technology avoids the problem that a large amount of toxic steam is generated by the traditional solution evaporation membrane formation, and improves the production efficiency at the same time.

3. Compared with the prior art, the present solution is low in production cost and is suitable for large-scale commercial production.

DETAILED DESCRIPTION OF THE EMBODIMENTS

The technical solution of the present disclosure will be described in detail with reference to the following examples.

The steps of pre-preparing a cellulose nanocrystal aqueous solution with a solid content of 0.5% and a pH of 1.8 in the following examples are as follows:

a commercially available cellulose nanocrystal aqueous solution is purchased, the pH of the cellulose nanocrystal aqueous solution is adjusted to 1.8 with nitric acid, and the solid content is adjusted to 0.5% by concentration or dilution.

Figure 1:
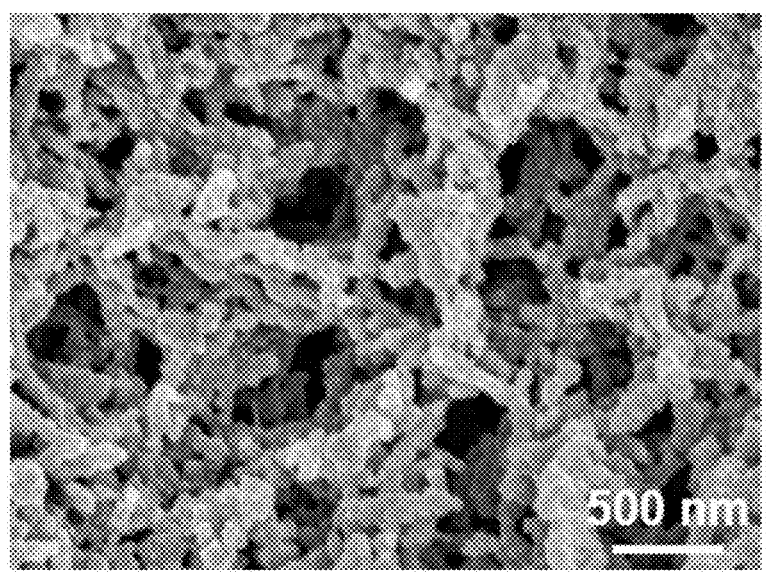
FIG. 1 shows the micro-morphology of a porous powder material CNC-g-PAN prepared in example I characterized by a field emission scanning electron microscope (FESEM).

Example I 40 mL of pre-prepared cellulose nanocrystal aqueous solution with a solid content of 0.5% and a pH of 1.8 is put in a three-necked flask under the protection of nitrogen; then 0.08 g of ceric ammonium nitrate as an initiator and 2 mL of a polymer monomer being acrylonitrile are added to the three-necked flask; magnetically stirring is performed at a constant temperature of 35° C. for 2 hours; and a product is washed with water several times and dried to obtain a porous powder material CNC-g-PAN, the micro-morphology of which is as shown in FIG. 1.

Figure 2:
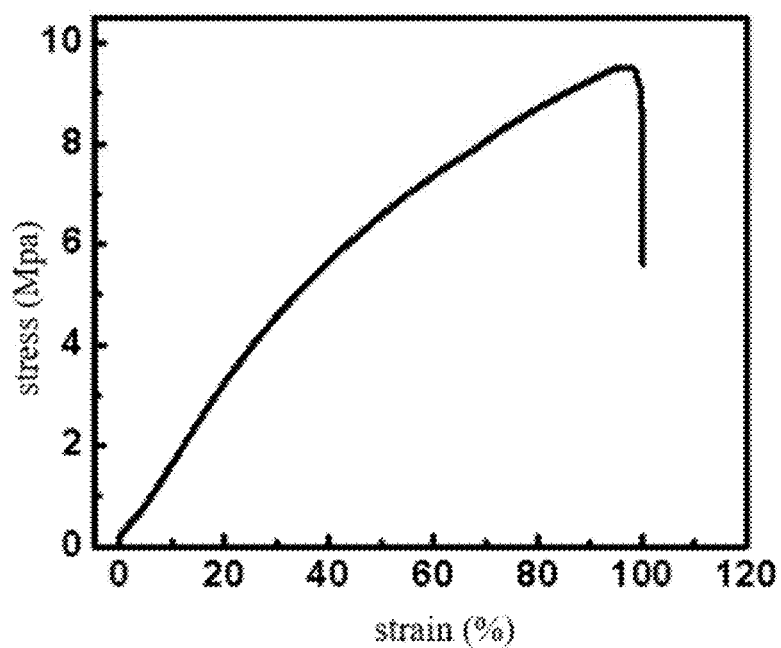
FIG. 2 is a diagram of the mechanical property of a solid electrolyte prepared in example I.
Figure 3:
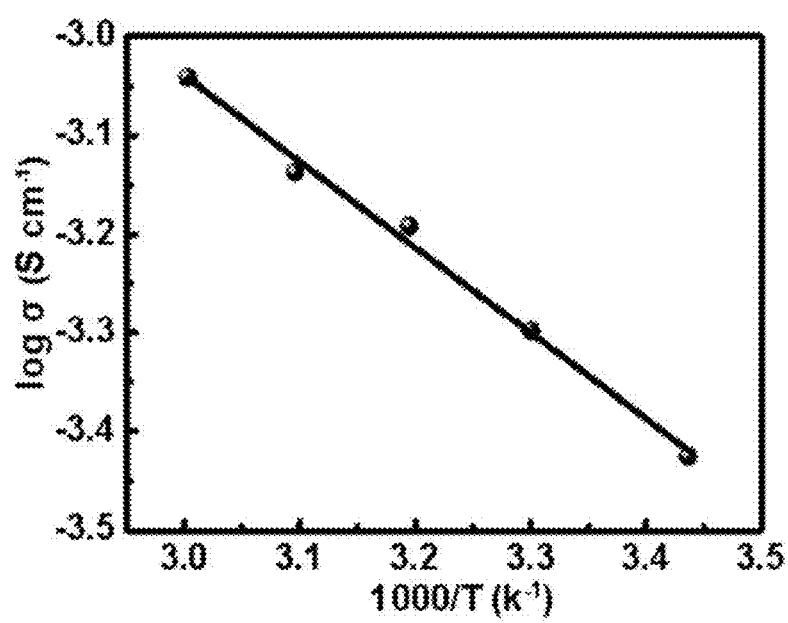
FIG. 3 is a relationship diagram of the change of ionic conductivity ($\sigma$) of a solid electrolyte prepared in example I with the temperature (T).
Figure 4:
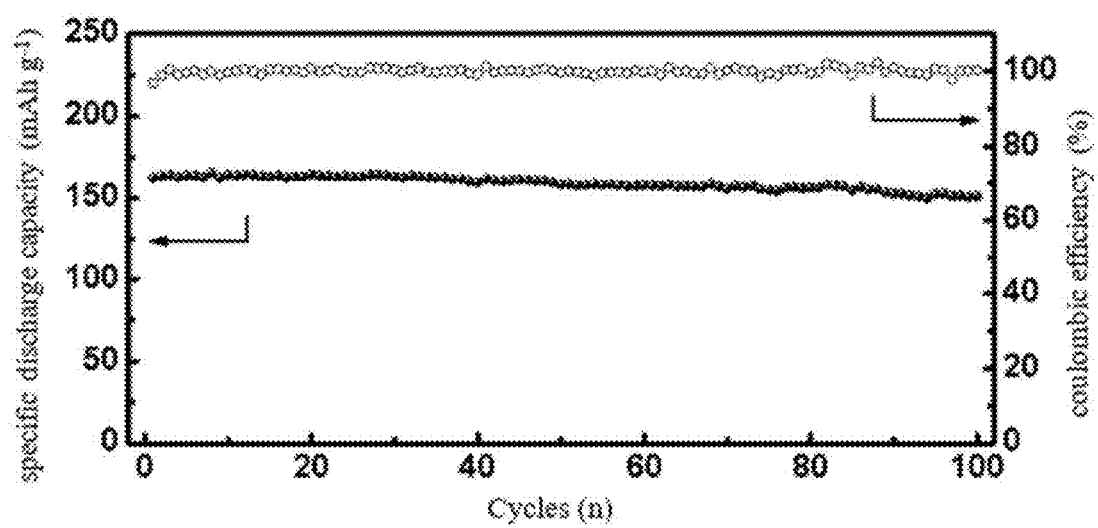
FIG. 4 is a cycle performance diagram of a button cell assembled with a solid electrolyte prepared in example I.

0.1 g of powder material CNC-g-PAN is put in a sample bottle; an ethylene carbonate solution (1 g/mL) of bistrifluoromethanesulfonimide lithium salt is slowly dropped into the sample bottle; after dropwise addition is complete, the sample bottle is sealed, and stored in an 80° C. constant-pressure constant-temperature oven for 10 hours; then the sample bottle is moved to an 80° C. vacuum constant-temperature oven, and the solvent content is adjusted to 10 wt %-15 wt %, and an appropriate amount of samples are taken for hot-pressing at the temperature of 150 DEG C. and at the pressure of 10 MPa to form a membrane, and thus a target solid electrolyte membrane is obtained. The mechanical performance of the target solid electrolyte membrane is shown in FIG. 2 and the target solid electrolyte membrane has Young's modulus of 9.5 MPa. The relationship of the change of the ionic conductivity ($\sigma$) of the electrolyte membrane with the temperature (T) is shown in FIG. 3. A disc with a diameter of 19 mm is cut out by a cutter to serve as an electrolyte, and a 2032 button cell is assembled by using ferrous lithium phosphate as a positive electrode and a lithium sheet as a negative electrode and is tested (set test parameters: the temperature being 60° C. the current density being 0.1C, the voltage range being 2.5-4V). The performance is shown in FIG. 4. The specific capacity of the cell can reach 163 mAh/g, and the capacity of the cell can be kept at 93% after 100 cycles.

Example II 40 mL of pre-prepared cellulose nanocrystal aqueous solution with a solid content of 0.5% and a pH of 1.8 is put in a three-necked flask under the protection of nitrogen; then 0.08 g of ceric ammonium nitrate as an initiator and 1.5 mL of a polymer monomer being acrylonitrile are added to the three-necked flask: magnetically stirring is performed at a constant temperature of 35° C. for 2 hours; and a product is washed with water several times and dried to obtain a porous powder material CNC-g-PAN.

An electrolyte membrane is prepared by the same process as in the example I and tested. The tested young's modulus of the electrolyte membrane is 6.4 MPa.

A 2032 button cell is assembled by using ferrous lithium phosphate as a positive electrode and a lithium sheet as a negative electrode and is tested at the temperature of 60° C. and the current density of 0.1C in the voltage range of 2.5-4V. The specific capacity of the cell can reach 154 mAh/g, and the capacity of the cell can be kept at 65% after 100 cycles.

Example III 40 mL of pre-prepared cellulose nanocrystal aqueous solution with a solid content of 0.5% and a pH of 1.8 is put in a three-necked flask under the protection of nitrogen; then 0.08 g of ceric ammonium nitrate as an initiator and 1 mL of a polymer monomer being acrylonitrile are added to the three-necked flask; magnetically stirring is performed at a constant temperature of 35° C. for 2 hours; and a product is washed with water several times and dried to obtain a porous powder material CNC-g-PAN.

An electrolyte membrane is prepared by the same process as in the example I and tested. The tested young's modulus of the electrolyte membrane is 3.8 MPa.

A 2032 button cell is assembled by using ferrous lithium phosphate as a positive electrode and a lithium sheet as a negative electrode and is tested at the temperature of 60° C. and the current density of 0.1C in the voltage range of 2.5-4V. The specific capacity of the cell can reach 127 mAh/g, and the capacity of the cell can be kept at 43% after 100 cycles.

What is claimed is:

1. A preparation method of a solid electrolyte, comprising the following steps:
    (1) adding a cellulose nanocrystal aqueous solution into a three-necked flask under the protection of nitrogen, then adding an initiator and a polymer monomer to the three-necked flask, magnetically stirring at a constant temperature of 20-80° C. until the reaction is complete, washing a product with water several times and drying the product to obtain a porous powder material;
    (2) moving the porous powder material obtained in step (1) into a sample bottle, dropping an amount of electrolyte solution into the sample bottle, sealing the sample bottle, storing the sample bottle in a 60-90° C. constant-pressure constant-temperature oven for 8-15 hours, then moving the sample bottle into a 60-90° C. vacuum constant-temperature oven, adjusting a content of the electrolyte solution to 10 wt %-15 wt %, and taking an amount of samples for hot-pressing to form a membrane, thereby obtaining a solid electrolyte membrane;
    (3) storing the solid electrolyte membrane obtained in step (2) in a glove box, and cutting the solid electrolyte membrane according to required specifications to obtain a target solid electrolyte;
    in the step (1), an addition ratio of the cellulose nanocrystal aqueous solution to the initiator to the polymer monomer is 40 ml:(0.05-0.1) g:(1-2) ml, and a solid content of the cellulose nanocrystal aqueous solution is 0.4%-1.2%; and in the step (2), a mass ratio of the porous powder material to an electrolyte added to the electrolyte solution is 1:(1-2).

2. The preparation method of a solid electrolyte according to claim 1, wherein in the step (1), the solid content of the cellulose nanocrystal aqueous solution is 0.5%, and a pH range is 1-4.

3. The preparation method of a solid electrolyte according to claim 1, wherein in step (1), the initiator is ammonium ceric nitrate.

4. The preparation method of a solid electrolyte according to claim 1, wherein in the step (1), the polymer monomer is methyl methacrylate, ethyl acrylate, acrylonitrile or vinyl alcohol.

5. The preparation method of a solid electrolyte according to claim 1, wherein in the step (2), the electrolyte solution is an ethylene carbonate solution of bistrifluoromethanesulfonimide lithium salt, a propylene carbonate solution of bistrifluoromethanesulfonimide lithium salt or an ethylene carbonate solution of lithium hexafluorophosphate.

6. The preparation method of a solid electrolyte according to claim 1, wherein in the step (2), a condition of hot-pressing membrane formation is 10 MPa/150° C.

\* \* \* \* \*